US012125633B2

(12) United States Patent
Kim et al.

(10) Patent No.: US 12,125,633 B2
(45) Date of Patent: Oct. 22, 2024

(54) SOFT MAGNETIC IRON-BASED POWDER, METHOD FOR MANUFACTURING THE SAME, AND METHOD FOR MANUFACTURING A SOFT MAGNETIC COMPOSITE

(71) Applicants: HYUNDAI MOTOR COMPANY, Seoul (KR); KIA CORPORATION, Seoul (KR)

(72) Inventors: Shin Gyu Kim, Hwaseong-si (KR); Hyung Seok Kwak, Gunpo-si (KR); Hyun Gon Lyu, Hwaseong-si (KR); Joon Chul Yun, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 94 days.

(21) Appl. No.: 18/071,180

(22) Filed: Nov. 29, 2022

(65) Prior Publication Data

US 2024/0021362 A1 Jan. 18, 2024

(30) Foreign Application Priority Data

Jul. 15, 2022 (KR) ........................ 10-2022-0087623

(51) Int. Cl.
*H01F 41/02* (2006.01)
*B22F 1/102* (2022.01)
(Continued)

(52) U.S. Cl.
CPC .......... *H01F 41/0246* (2013.01); *B22F 1/102* (2022.01); *B22F 1/16* (2022.01);
(Continued)

(58) Field of Classification Search
CPC .......... H01F 41/0246; H01F 1/26; H01F 1/33; H01F 3/08; H01F 1/24; H01F 1/20;
(Continued)

(56) References Cited

U.S. PATENT DOCUMENTS 8,236,420 B2 8/2012 Skaarman et al.
8,647,743 B2 2/2014 Skaarman et al.
(Continued)

FOREIGN PATENT DOCUMENTS

CN 114160788 A * 3/2022 ............... H01F 1/14
EP 1246209 B1 10/2006
(Continued)

OTHER PUBLICATIONS

CN114160788A: Espacenet English machine translation (Year: 2022).*

*Primary Examiner* — Adil A. Siddiqui
(74) *Attorney, Agent, or Firm* — Lempia Summerfield Katz LLC

(57) ABSTRACT

A soft magnetic iron-based powder has a composite insulating film and a method for manufacturing the same and a method for manufacturing a soft magnetic composite are provided. The soft magnetic iron-based powder may include: an iron-based core powder formed in a powder form; a first layer formed on a surface of the iron-based core powder and coated with an inorganic material containing phosphate; a second layer formed on a surface of the first layer, in which sodium silicate, mica fine particle and bismuth (III) oxide fine particle are distributed; and a third layer formed on the surface of the first or second layer whose surface is exposed, in which an organic lubricant and an inorganic lubricant are distributed.

20 Claims, 4 Drawing Sheets

(51) Int. Cl.

| | |
|---|---|
| ***B22F 1/16*** | (2022.01) |
| ***C22C 33/02*** | (2006.01) |
| ***H01F 1/26*** | (2006.01) |
| ***H01F 1/33*** | (2006.01) |
| ***H01F 3/08*** | (2006.01) |

(52) U.S. Cl.
CPC ............... *C22C 33/02* (2013.01); *H01F 1/26* (2013.01); *H01F 1/33* (2013.01); *H01F 3/08* (2013.01); *B22F 2998/10* (2013.01); *B22F 2999/00* (2013.01); *C22C 2202/02* (2013.01)

(58) Field of Classification Search
CPC ........ B22F 1/102; B22F 1/16; B22F 2998/10; B22F 2999/00; B22F 1/05; B22F 1/052; B22F 1/103; C22C 33/02; C22C 2202/02; C22C 32/0094
See application file for complete search history.

(56) References Cited

U.S. PATENT DOCUMENTS

| | | | | |
|---|---|---|---|---|
| 9,153,368 | B2 | 10/2015 | Ye et al. | |
| 2011/0006246 | A1 | 1/2011 | Skaarman et al. | |
| 2012/0292555 | A1 | 11/2012 | Skaarman et al. | |
| 2014/0049354 | A1 * | 2/2014 | Ye ....................... | C22C 33/0207 428/221 |
| 2014/0085039 | A1 | 3/2014 | Ye et al. | |

FOREIGN PATENT DOCUMENTS

| | | | |
|---|---|---|---|
| KR | 20070023760 | A | 2/2007 |
| KR | 100845392 | B1 | 7/2008 |
| KR | 20100135830 | A | 12/2010 |
| KR | 20130130797 | A | 12/2013 |
| KR | 101926100 | B1 | 12/2018 |

* cited by examiner

SOFT MAGNETIC IRON-BASED POWDER, METHOD FOR MANUFACTURING THE SAME, AND METHOD FOR MANUFACTURING A SOFT MAGNETIC COMPOSITE

CROSS REFERENCE TO RELATED APPLICATION

The present application claims priority to Korean Patent Application No. 10-2022-0087623, filed on Jul. 15, 2022, the entire contents of which are incorporated herein for all purposes by this reference.

BACKGROUND

Technical Field

The present disclosure relates to a soft magnetic iron-based powder, a method for manufacturing the same, and a method for manufacturing a soft magnetic composite, and more particularly, to a soft magnetic iron-based powder having a composite insulating film, a method for manufacturing the same, and a method for manufacturing a soft magnetic composite.

Description of the Related Art

According to the recent trend of electrification of various devices, the demand for soft magnetic composites used for core components such as stators and rotors is increasing.

Core components such as stators and rotors have traditionally been manufactured through lamination of silicon electrical steel. However, the components manufactured by laminating silicon electrical steels have a disadvantage in that they have large iron loss in a high frequency region due to two-dimensional magnetic properties and a large amount of processing during component manufacturing, resulting in large loss of raw materials.

Thus, a method for manufacturing components using a traditional powder metallurgy technology by manufacturing a soft magnetic composite in powder form was introduced.

In soft magnetic iron-based powders, an electrical insulation coating is applied to each iron powder particle. The insulation-coated iron powder has the advantage of being able to manufacture three-dimensional net-shaped components with three-dimensional magnetic properties through compression molding and heat treatment together with appropriate lubricants and binders. In addition, the soft magnetic iron-based powders enable effective component design and manufacturing due to a higher degree of design freedom compared to the silicon electrical steels.

On the other hand, the performance of soft magnetic iron-based powders needs to be improved in order to improve the performance of the core components with the soft magnetic iron-based powders and to reduce the weight and size of the soft magnetic core components.

One of the important indicators for improving the performance of soft magnetic core components is to increase a magnetic flux density.

The magnetic flux density increases as the density of the core component increases and requires the minimization of chemical and organizational defects. Therefore, various methods for maximizing the molding density of the soft magnetic iron-based powders have been proposed and used.

For example, in order to improve the molding density of soft magnetic iron-based powders, the compression molding of soft magnetic iron-based powders at a high pressure of 1000 MPa or more or a high temperature of 80° C. or more has been proposed. However, in practice, defects due to excessive friction and abrasion in molds and molded articles occur. As a result, the density of the core component is lowered and there is a limitation in increasing the magnetic flux density.

Therefore, in order to overcome the limitation of compression molding technology under high pressure and high temperature conditions, a technology for effectively realizing a high density using a liquid lubricant has been proposed. However, there are limitations in that there is a significant difference depending on the method of adding the liquid lubricant and the type of soft magnetic iron-based powder and reproducibility is not secured.

On the other hand, another important index for improving the performance of the soft magnetic core component is to reduce core loss.

Reducing the core loss is effective to increase the resistance of the soft magnetic iron-based powders. Various methods have been proposed and used to increase the resistance of the soft magnetic iron-based powders.

For example, in order to increase the resistance of the soft magnetic iron-based powders, an additive such as an inorganic material in the form of a metal salt and an organic material in the form of a resin may be included. However, the additive selected to increase the resistance has inferior magnetic properties by itself. Thus, there is a limitation that, as the amount of the additive increases, the magnetic properties decrease.

The content described as the above background art is only for understanding the background. The above content should not be taken as an acknowledgment that it corresponds to the prior art already known to those of ordinary skill in the art.

SUMMARY

A soft magnetic iron-based powder is provided in which a composite insulating film is formed on the surface of the iron-based core powder without the addition of an organic binder. A method for manufacturing the same is also provided.

In addition, a method is provided for manufacturing a soft magnetic composite using a soft magnetic iron-based powder having a composite insulating film formed thereon.

The technical objects to be achieved by the present disclosure are not limited to the technical objects mentioned above. Other technical objects not mentioned can be clearly understood by those of ordinary skill in the art from the description of the present disclosure.

A soft magnetic iron-based powder according to an embodiment of the present invention includes: an iron-based core powder formed in a powder form; a first layer formed on a surface of the iron-based core powder and coated with an inorganic material containing phosphate; a second layer formed on a surface of the first layer, in which sodium silicate, mica fine particle, and bismuth (III) oxide fine particle are distributed; and a third layer formed on the surface of the first or second layer whose surface is exposed, in which an organic lubricant and an inorganic lubricant are distributed.

A particle size of the iron-based core powder nay be in a range of 45 to 500 micrometers (μm).

The first layer may be iron phosphate formed by an oxidation reaction of the phosphate and the iron-based core powder.

In the second layer, the sodium silicate, the mica fine particle, and the bismuth (III) oxide fine particle may be physically attached to the surface of the first layer.

A particle size of the mica fine particle and the bismuth (III) oxide fine particle of the second layer may be 1/10 or less of a particle size of the iron-based core powder.

The particle size of the mica fine particle and the bismuth (III) oxide fine particle of the second layer may be 4.5 μm or less.

A crystal structure of the bismuth (III) oxide fine particle of the second layer may be an alpha phase.

The organic lubricant and inorganic lubricant of the third layer may be solid lubricants. A particle size of the organic lubricant and inorganic lubricant of the third layer may be larger than a surface roughness of the iron-based core powder.

The particle size of the organic lubricant and inorganic lubricant of the third layer may be in a range of 5 to 45 μm.

The inorganic lubricant may be molybdenum disulfide ($MoS_2$) or boron nitride (BN).

In addition, a method for manufacturing a soft magnetic iron-based powder according to an embodiment includes: preparing an iron-based core powder; preparing a first coating solution containing phosphoric acid; forming a first layer coated with an inorganic material containing phosphate on a surface of the iron-based core powder by spraying the first coating solution on a surface of the iron-based core powder; preparing a second coating solution in which sodium silicate, mica fine particle, and bismuth (III) oxide fine particle are dispersed; forming a second layer in which the sodium silicate, the mica fine particle, and the bismuth (III) oxide fine particle are distributed on the surface of the first layer by spraying the second coating solution on the iron-based core powder on which the first layer is formed; preparing a third coating solution in which an organic lubricant and an inorganic lubricant are dispersed; and forming a third layer in which the organic lubricant and the inorganic lubricant are distributed on the surface of the first or second layer whose surface is exposed by spraying the third coating solution on the iron-based core powder on which the second layer is formed.

In the core powder preparation, a particle size of the prepared iron-based core powder may be in a range of 45 to 500 μm.

In the first coating solution preparation, the first coating solution may be prepared by dissolving 0.1 to 5% by weight of phosphoric acid with respect to 100% by weight of acetone.

In the first layer formation, the first layer may be formed on the surface of the iron-based core powder by spraying the first coating solution in a state in which the iron-based core powder is suspended.

In the first layer formation, the first layer may be formed by an oxidation reaction of the first coating solution and the iron-based core powder.

In the second coating solution preparation, the second coating solution may be prepared by dispersing 2 to 10% by weight of the sodium silicate, 2 to 10% by weight of the mica fine particle, and 2 to 10% by weight of the bismuth (III) oxide fine particle with respect to 100% by weight of water. Further, in the third coating solution preparation, the third coating solution may be prepared by dispersing 1 to 8% by weight of the organic lubricant and 0.1 to 2% by weight of the inorganic lubricant with respect to 100% by weight of the water.

In the second layer formation, the sodium silicate, the mica fine particle, and the bismuth (III) oxide fine particle may be physically attached to the surface of the first layer. In the third layer formation, the organic lubricant and the inorganic lubricant may be physically attached to the surface of the first or second layer whose surface is exposed.

In addition, a method for manufacturing a soft magnetic composite according to an embodiment includes preparing an iron-based core powder including: a first layer coated with an inorganic material containing phosphate formed on a surface of an iron-based core powder; a second layer in which sodium silicate, mica fine particle and bismuth (III) oxide fine particle are distributed on a surface of the first layer; and a third layer formed on the surface of the first or second layer whose surface is exposed, in which an organic lubricant and an inorganic lubricant are distributed. The method further includes compression molding the iron-based core powder into a molded article having a predetermined shape using a mold heated to room temperature or 80° C. or less. The method further includes heat-treating the molded article at a temperature in a range of 600 to 700° C.

The powder preparation may include: preparing the iron-based core powder; preparing a first coating solution containing phosphoric acid; forming the first layer coated with the inorganic material containing the phosphate on a surface of the iron-based core powder by spraying the first coating solution on a surface of the iron-based core powder; preparing a second coating solution in which the sodium silicate, the mica fine particle, and the bismuth (III) oxide fine particle are dispersed; forming the second layer in which the sodium silicate, the mica fine particle, and the bismuth (III) oxide fine particle are distributed on the surface of the first layer by spraying the second coating solution on the iron-based core powder on which the first layer is formed; preparing a third coating solution in which the organic lubricant and the inorganic lubricant are dispersed; and forming the third layer in which the organic lubricant and the inorganic lubricant are distributed on the surface of the first or second layer whose surface is exposed by spraying the third coating solution on the iron-based core powder on which the second layer is formed.

The molded article that has undergone the heat treatment may have a resistivity of more than 200 microhmmeter (μΩ·m), a saturation magnetic flux density of more than 1.4 Tesla (T), a core loss of less than 200 Watt/kilogram (W/kg) at 1 T induction and 1 kilohertz (kHz) frequency, and a coercive force of 200 Amp/meter (A/m).

According to an embodiment of the present disclosure, it is possible to manufacture a soft magnetic iron-based powder capable of realizing high magnetic flux density and low core loss without deterioration of powder flowability by using a solid organic lubricant and an inorganic lubricant without using a liquid lubricant.

Further, through this soft magnetic iron-based powder, it is possible to have a high molding density even at a pressure of 1000 MPa or less. By coating a small amount of a composite insulating material that does not cause deterioration of powder flowability and magnetic properties on the surface of the iron-based core powder without an organic binder, heat treatment can be performed at a higher temperature, thereby ensuring low core loss.

DETAILED DESCRIPTION

Figure 1:
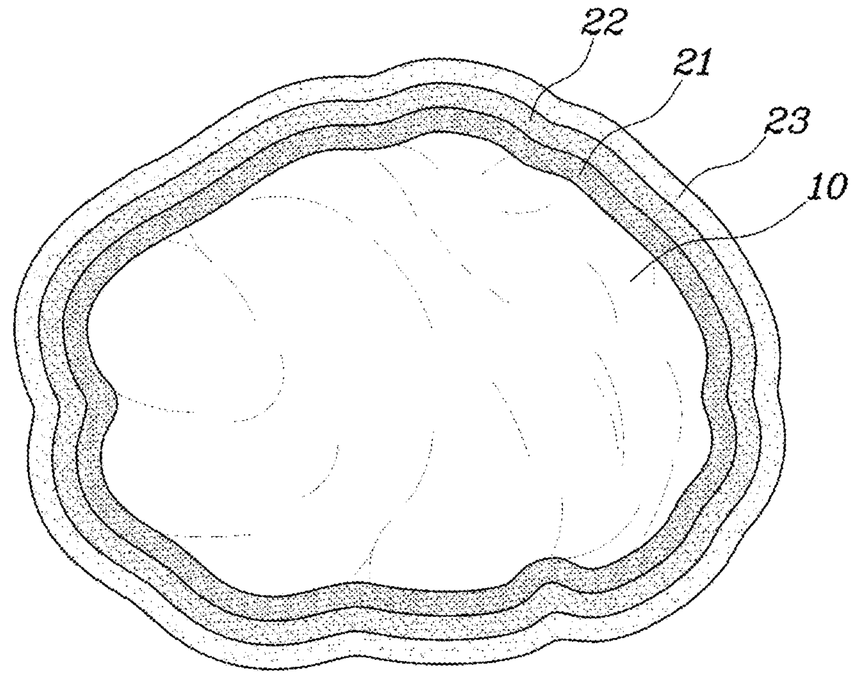
FIG. 1 illustrates a cross-sectional view of a soft magnetic iron-based powder according to an embodiment of the present disclosure.

Hereinafter, embodiments of the present disclosure are described in more detail with reference to the accompanying drawings. However, the present disclosure is not limited to the embodiments disclosed below but is implemented in a variety of different forms. These embodiments are provided only so that the disclosure is complete and to inform those of ordinary skill in the scope of the disclosure. In the drawings, like reference numerals refer to like elements.

Figure 2A:
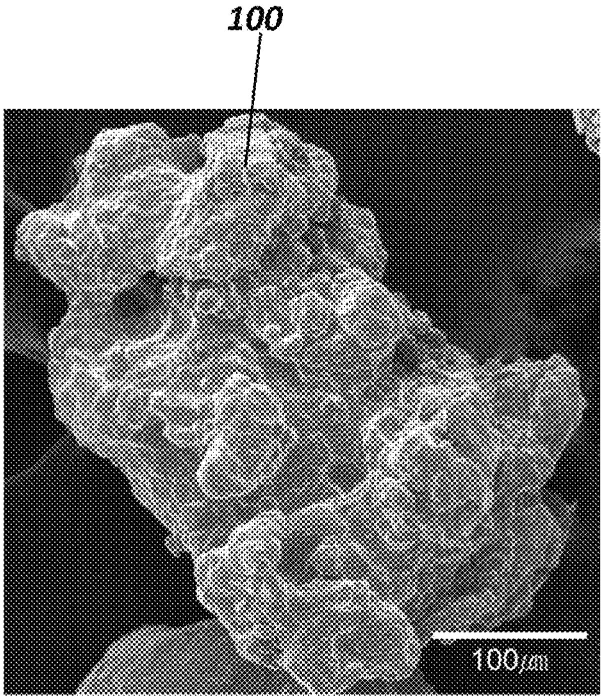
FIG. 2A illustrates a SEM photograph of a soft magnetic iron-based powder according to an embodiment of the present disclosure.
Figure 2B:
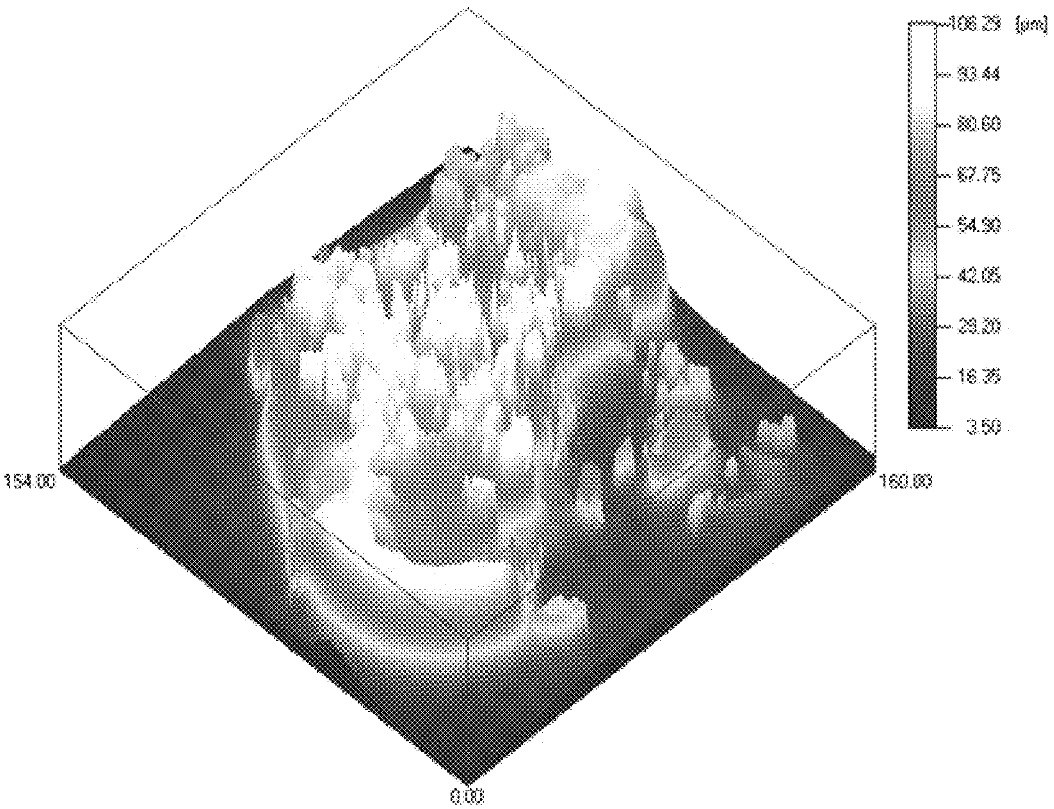
FIG. 2B illustrates a surface AFM analysis image of a soft magnetic iron-based powder according to an embodiment of the present disclosure.
Figure 2C:
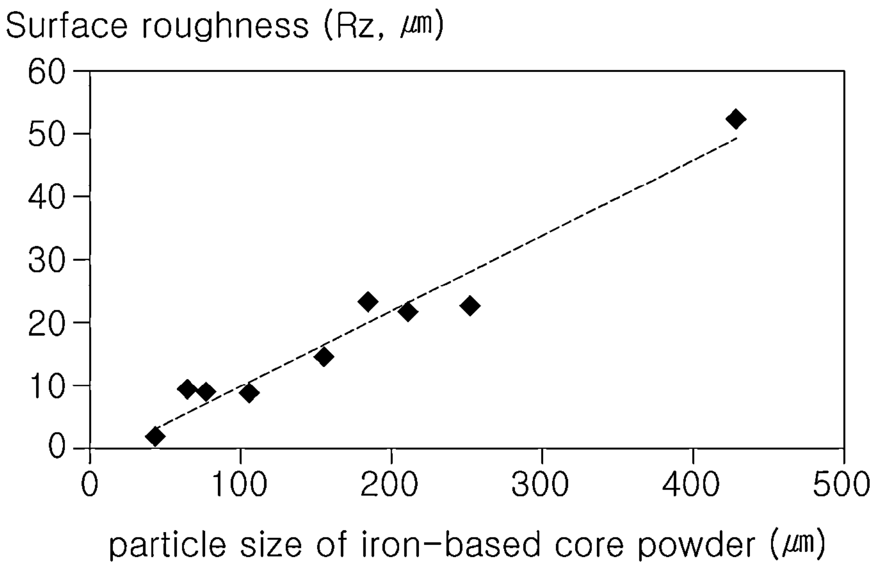
FIG. 2C illustrates a graph of the relationship between the particle size and surface roughness of soft magnetic iron-based powders according to Comparative Examples and Examples.

FIG. 1 illustrates a cross-sectional view of a soft magnetic iron-based powder according to an embodiment of the present disclosure. FIG. 2A illustrates a SEM photograph of a soft magnetic iron-based powder according to an embodiment of the present disclosure. FIG. 2B illustrates a surface AFM analysis image of a soft magnetic iron-based powder according to an embodiment of the present disclosure. FIG. 2C illustrates a graph of the relationship between the particle size and surface roughness of soft magnetic iron-based powders according to Comparative Examples and Examples.

As illustrated in FIG. 1, a soft magnetic iron-based powder according to an embodiment of the present disclosure includes: an iron-based core powder 10 formed in a powder form; a first layer 21 formed on the surface of the iron-based core powder 10 and coated with an inorganic material containing phosphate; a second layer 22 formed on the surface of the first layer 21, in which sodium silicate, mica fine particle, and bismuth (III) oxide fine particle are distributed; and a third layer 23 formed on the surface of the first layer 21 or second layer 22 whose surface is exposed, in which an organic lubricant and an inorganic lubricant are distributed.

Iron-based particles of various components used in a powder metallurgy field may be employed as the iron-based core powder 10. For example, the iron-based core fine particle 10 may be pure iron or an iron alloy having a low content of impurities such as carbon, oxygen, manganese, and silicon.

In particular, the iron-based core powder 10 may be formed in an irregular particle shape in order to realize high strength when manufacturing the soft magnetic core component. This is because, when the iron-based core powder 10 having an irregular shape is compression-molded, a cold press welding effect is exhibited, and thus high molding strength is obtained. Therefore, the iron-based core powder 10 may be prepared by water atomization. If the iron-based core powder 10 is manufactured by other methods such as gas spraying or centrifugal spraying, the strength of the core component manufactured through compression molding of the iron-based core powder 10 is significantly lowered. Thus, defects such as cracks may occur under the circumstance such as winding or operator handling.

Here, the particle size of the iron-based core powder 10 may be in a range of 45 to 500 μm. The reason for limiting the size of the iron-based core powder 10 is described below.

The particle size of the iron-based core powder 10 is determined according to the use of the core component. In the case of an electric motor core, high molding density and molding strength are required under the condition that it is driven in a frequency range of 1 kHz or less, so the larger the particle size is, the more advantageous. As the size of the particles increases, the specific surface area decreases, which is advantageous for plastic deformation during compression.

For this reason, the particle size of the iron-based core powder 10 may be 45 μm or more, 75 μm or more, or 106 μm or more. However, when the iron-based core powder 10 is manufactured by a water injection method, inclusion particles such as metal oxide are inevitably included. Because their size is larger than 500 μm, the iron-based core powder 10 may be 500 μm or less, 425 μm or less, or 250 μm or less in order to prevent the incorporation of such metal oxides.

The first layer 21 is an insulating film formed on the surface of the iron-based core powder 10 and is formed by coating an inorganic material containing a phosphate. In this case, the first layer 21 is formed of a thin and uniform film-type iron phosphate ($Fe_3(PO_4)_2$) through a chemical oxidation reaction between phosphate and iron atoms present on the surface of the iron-based core powder 10.

The second layer 22 refers to the surface of the iron-based core powder 10 coated with the first layer 21, i.e., the surface in which sodium silicate, mica fine particle and bismuth (III) oxide fine particle are attached and distributed to the surface of the first layer 21.

In this case, in the second layer 22, the sodium silicate, the mica fine particle, and the bismuth (III) oxide fine particle are physically attached to the surface of the first layer 21. Therefore, the second layer 22 is not a thin and uniform film like the first layer 21, but is formed by attaching the sodium silicate, the mica fine particle and the bismuth (III) oxide fine particle to the surface of the first layer 21 in an island form.

Here, the particle size of the mica fine particle and bismuth (III) oxide fine particle of the second layer 22 may be determined according to the particle size of the iron-based core powder 10. For example, the particle size of the mica fine particle and bismuth (III) oxide fine particle of the second layer 22 may be 1/10 or less of the particle size of the iron-based core powder 10. In other words, the particle size of the mica fine particle and bismuth (III) oxide fine particle of the second layer 22 may be 4.5 μm or less.

The reason is that in order to achieve a uniform coating with minimal defects on the surface of the iron-based core powder the smaller the particle size of the fine particle forming the second layer 22, the more effective, but the smaller the particle size, the price of the raw material rises rapidly. Therefore, it is important to determine the appropriate size. Because the iron-based core powder 10 manufactured by a water injection method has an irregular surface shape, the fine particle having a size smaller than the surface roughness of the iron-based core powder 10 is attached in order to form a relatively uniform coating layer.

Therefore, as a result of analyzing the surface roughness according to the average particle size of the iron-based core powder 10, as can be seen in FIGS. 2A-2C, it is confirmed that the roughness characteristic of the iron-based core powder 10 is about 1/10 of the particle size. Therefore, the particle size of the fine particle attached to the surface of the first layer 21 may be maintained at 1/10 or less of the particle size of the iron-based core powder 10. Because the particle size of the iron-based core powder 10 is limited to particle sizes in a range of 45 to 500 μm, the particle size of the fine particle is 4.5 μm or less based on the lowest size of 45 μm. In certain examples, the particle size of the fine particle may be 4 μm or less or 3 μm or less.

In particular, the crystal structure of the bismuth (III) oxide fine particle forming the second layer 22 may be an alpha phase. The reason is that the bismuth (III) oxide has different physical properties depending on the crystal structure, and in order to secure high insulation, the range may be limited to the alpha phase having dielectric material properties. The bismuth (III) oxide has the dielectric constant of 33.9 when the crystal structure is in the alpha phase, whereas it has the dielectric constant of 0 in the beta phase. Because both alpha and beta phases are oxides, they have insulating properties. However, the bismuth (III) oxide in the alpha phase has significantly better performance than the bismuth (III) oxide in the beta phase in insulating properties due to eddy currents occurring at high frequencies.

The third layer 23 refers to a layer, formed on the surface of the first layer 21 or second layer 22 whose surface is exposed, in which an organic lubricant and an inorganic lubricant are attached and distributed in a mixed state.

Here, the organic lubricant and inorganic lubricant of the third layer 23 may be solid lubricants.

In certain examples, only solid organic lubricant may be mixed as a lubricant, but there is a limitation to realizing high density molding without defects such as scratches or cracks only with the organic lubricant. The reason is that the lubricating performance of the organic lubricant is lowered at a locally elevated temperature due to friction between the iron-based core powders 10, and is liquefied by frictional heat, leaving pores while increasing the unit volume. Therefore, in this embodiment, an inorganic lubricant having no change in lubrication performance depending on the ambient temperature is mixed with the organic lubricant and used in combination for the third layer 23.

Meanwhile, as the organic lubricant, an organic lubricant used in a conventional powder metallurgy field may be used. For example, fatty acid-based waxes, oligomers, polymers, and metal stearic acid or other derivatives thereof in a form combined with a metal element can be used.

In addition, as the inorganic lubricant, the inorganic lubricant having a hexagonal crystal structure such as molybdenum disulfide ($MoS_2$) or boron nitride (BN) may be used. This inorganic lubricant has excellent lubricating performance with crystal slip plane against external stress. However, because its lubricating performance is comparatively lower than that of an organic lubricant, the inorganic lubricant may be mixed with the organic lubricant for the purpose of complementing each other. However, because it is impossible to completely control the agglomeration of the fine particles by a conventional mixing method, the organic lubricant and the inorganic lubricant may be supplied and attached by a fluidized bed coating method.

Meanwhile, the particle size of the organic lubricant and inorganic lubricant of the third layer 23 may be larger than the surface roughness of the iron-based core powder 10.

In other words, the particle size of the organic lubricant and inorganic lubricant, which are solid lubricants, do not significantly affect the molding properties, so they can be selectively used in a wide range. However, when uniformly attached to the high and low curve on the surface of the iron-based core powder 10, the lubricant attached to the low curve is limited in direct contact during compression molding. Therefore, the particle size of the iron-based core powder 10 may have a larger particle size than the surface roughness of the iron-based core powder 10. In addition, when the particle size of the organic lubricant and inorganic lubricant is larger than the particle size of the iron-based core powder 10, the bonding occurs due to strong adhesion to the iron-based core powder 10, not the lubricating function. Thus, the particle size of the organic lubricant and inorganic lubricant may be maintained in a range of 5 to 45 μm, in a range of 10 to 30 μm, or in a range of 20 to 25 μm.

Next, a method for manufacturing the soft magnetic iron-based powder is described herein.

A method for manufacturing a soft magnetic iron-based powder according to an embodiment of the present disclosure includes: preparing an iron-based core powder; preparing a first coating solution containing phosphoric acid; forming a first layer coated with an inorganic material containing phosphate on the surface of the iron-based core powder by spraying the first coating solution on the surface of the iron-based core powder; preparing a second coating solution in which sodium silicate, mica fine particle and bismuth (III) oxide fine particle are dispersed; forming a second layer in which the sodium silicate, the mica fine particle and the bismuth (III) oxide fine particle are distributed on the surface of the first layer by spraying the second coating solution on the iron-based core powder on which the first layer is formed; preparing a third coating solution in which an organic lubricant and an inorganic lubricant are dispersed; and forming a third layer in which the organic lubricant and the inorganic lubricant are distributed on the surface of the first layer or second layer whose surface is exposed by spraying the third coating solution on the iron-based core powder on which the second layer is formed.

The core powder preparation includes preparing the iron-based core powder through water spraying, and as described above, the iron-based core powder having a particle size in a range of 45 to 500 μm is prepared.

The first coating solution preparation includes preparing the coating solution for forming the first layer. The first coating solution is prepared by dissolving phosphoric acid in acetone as a solvent. In this case, because the reaction time of the first coating solution should be increased as the concentration of phosphoric acid is lower, it is important to secure an appropriate concentration and reaction time. However, if the concentration exceeds a certain threshold value, peroxidation products such as iron oxide other than phosphate are generated according to the excessive oxidation reaction. Therefore, the first coating solution is prepared by dissolving to 5% by weight, 0.1 to 3% by weight, or 0.1 to 1% by weight of phosphoric acid based on 100% by weight of acetone.

Forming the first layer includes forming the first layer on the surface of the iron-based core powder by using the prepared first coating solution by a fluidized bed coating method. The first layer is formed on the surface of the iron-based core powder by spraying the first coating solution in a state in which the iron-based core powder is suspended in a container. Here, the first layer is formed by oxidation reaction between the phosphate of the first coating solution and the iron atoms present on the surface of the iron-based core powder.

The second coating solution preparation includes preparing the coating solution for forming the second layer. The second coating solution is prepared by dispersing the sodium silicate, the mica fine particle, and the bismuth (III) oxide fine particle in water as a solvent. In this case, the sodium silicate may be dispersed in a range of 2 to 10% by weight, in a range of 4 to 8% by weight, or in a range of 5 to 7% by weight, based on 100% by weight of water. The mica fine particle and the bismuth (III) oxide fine particle may each be dispersed in a range of 2 to 10% by weight, in a range of 4 to 8% by weight, or in a range of 5 to 7% by weight, based on 100% by weight of water, like the sodium silicate.

In this case, because the sodium silicate, the mica fine particle, and the bismuth (III) oxide fine particle are raw materials that do not affect each other physically and chemically, they are added at the same time to prepare and utilize the second coating solution as a single solution. Alternatively, the second coating solution can be used by separately preparing three coating solutions in which the sodium silicate, the mica fine particle, and the bismuth (III) oxide fine particle are dispersed, respectively. As the sodium silicate and the mica fine particle, products used in conventional industries can be used, and talc fine particles having a layered structure can be used as the mica because the range of raw materials for mica is vast.

Forming the second layer includes forming the second layer on the iron-based core powder on which the first layer is formed by using the prepared second coating solution by a fluidized bed coating method. Without an organic binder, in a state in which the iron-based core powder on which the first layer is formed is suspended in a container, the second coating solution is sprayed to physically attach the sodium silicate, the mica fine particle, and the bismuth (III) oxide fine particle to the surface of the first layer so that they are distributed.

The third coating solution preparation includes preparing the coating solution forming the third layer. The third coating solution is prepared by dispersing the organic lubricant and the inorganic lubricant together in water as a solvent. In this case, with respect to 100% by weight of water, the organic lubricant is dispersed in a range of 1 to 8% by weight, in a range of 2 to 6% by weight, or in a range of 3 to 5% by weight. The inorganic lubricant is dispersed in a range of 0.1 to 2% by weight, in a range of 0.5 to 1% by weight, or in a range of 0.6 to 0.8% by weight.

Meanwhile, in the case of the third coating solution using an organic solvent as a solvent, because the organic lubricant is completely dissolved and the lubricating performance may disappear after coating, a solution using water as the solvent is used. In this case, because the organic lubricant does not dissolve in water and the degree of dispersibility is lowered, a separate dispersant may be additionally used.

Forming the third layer includes forming the third layer on the iron-based core powder on which the second layer is formed by using the prepared third coating solution by a fluidized bed coating method. In a state in which the core powder in which the first layer and the second layer are formed is suspended in the container, the third coating solution is sprayed so that the organic lubricant and the inorganic lubricant are physically attached to the surface of the first or second layer to be distributed.

Meanwhile, in forming the first layer, the second layer, and the third layer, the coating and drying of the iron-based core powder in which a fluidized layer is formed in the container can be realized simultaneously through spraying and hot air of the first coating solution, the second coating solution, and the third coating solution. A film with excellent uniformity is thus formed in a relatively short time.

Therefore, in forming the first layer, the second layer, and the third layer, the process time for coating the first coating solution, the second coating solution and the third coating solution by spraying and hot air treatment on the iron-based core powder is in a range of 10 to 50 minutes, in a range of 20 to 40 minutes, or in a range of 25 to 35 minutes, respectively. This is because if the process time is shorter than 10 minutes, the coating material in each coating solution is less attached to the surface of the iron-based core powder, making it difficult to secure the required properties. Also, this is because if the process time exceeds 50 minutes, conversely, too much coating material is attached to the surface of the iron-based core powder, so that the flowability and molding density of the powder in addition to the target insulation are excessively reduced, and magnetic properties may be deteriorated.

Meanwhile, compared to the iron-based core powder, the soft magnetic iron-based powder after the third layer forming step may have the increased contents in a range of 0.06 to 0.1 t % by weight of P, in a range of 0.1 to 0.3% by weight of Si, and in a range of 0.3 to 0.5% by weight of Bi.

Next, a method for manufacturing a soft magnetic composite using the soft magnetic iron-based powder manufactured by the above manufacturing method is described herein.

A method for manufacturing a soft magnetic composite according to an embodiment includes preparing an iron-based core powder that includes: a first layer coated with an inorganic material containing phosphate formed on the surface of an iron-based core powder; a second layer in which sodium silicate, mica fine particle, and bismuth (III) oxide fine particle are distributed on a surface of the first layer; and a third layer formed on the surface of the first or second layer whose surface is exposed, in which an organic lubricant and an inorganic lubricant are distributed. The method further includes compression molding the iron-based core powder into a molded article having a predetermined shape using a mold heated to room temperature or 80° C. or less. The method further includes heat-treating the molded article at a temperature in a range of 600 to 700° C.

The powder preparation process includes preparing the iron-based core powder in which the first layer, the second layer, and the third layer are formed, and is achieved by the method for preparing the soft magnetic iron-based powder described above.

The molding process includes compression molding into a molded article of a predetermined shape by filling a mold with the prepared powder mixture. A molding method employed in a conventional powder metallurgy field can be applied as the molding process.

For example, the iron-based core powder is uniaxially pressed with a compression pressure in a range of 400 to 1000 MPa in a mold heated to room temperature or 80° C. or less to form a molded article. The molded article thus molded has a molding density of 7 g/cm$^3$ or more.

The heat-treating process is performed to remove residual stress generated in the molded article during molding. A heat treatment method employed in a conventional powder metallurgy field may be applied for the heat-treating process.

For example, the heat treatment may be carried out at a temperature in a range of 600 to 700° C. in order to effectively reduce the residual stress generated during molding.

In this case, the heat treatment may be performed in an inert atmosphere such as nitrogen or argon. However, if necessary, the heat treatment may be performed in air or in a non-reducing atmosphere in order to generate a small amount of oxide on the surface of the molded article. However, because an oxide-based insulating material is used as a coating material, heat-treating in a reducing atmosphere is limited.

In particular, a large amount of plastic deformation tissue and residual stress such as dislocations are generated and remained in the molded article during molding, which is an important factor for lowering magnetic properties.

Therefore, it is important to remove the residual stress remaining in the molded article by the heat treatment.

In other words, the reason for limiting the heat treatment to a temperature in a range of 600 to 700° C. is that at a temperature exceeding 700° C., sintering between insulating materials or iron-based core powders occurs, cracks and defects of the insulating film occur, the resistivity is lowered, and as a result, the core loss increases. Further, at a heat treatment temperature of less than 600° C., the residual stress generated during compression molding is not completely resolved, so that the coercive force increases, and the core loss may also increase.

The molded article that has been subjected to this heat-treating process has a resistivity of greater than 200 μΩ·m, greater than 500 μΩ·m, or greater than 700 μΩ·m, and a saturation magnetic flux density of greater than 1.4 T, greater than 1.6 T, or greater than 1.8 T.

Further, the molded article has a coercive force of less than 200 A/m, less than 150 A/m, or less than 100 A/m, and the core loss of less than 200 W/kg, less than 150 W/kg, or less than 100 W/kg, at a frequency of 1 kHz and induction of 1 T.

Hereinafter, the present disclosure is described through comparative examples and examples.

The iron-based core powder prepared by a water spraying method having the Fe content of more than 99.5% by weight was used as a raw material powder. The prepared water-sprayed iron-based core powder was changed to have the particle size of the iron-based core powder as shown in Table 1.

Then, the first coating solution was prepared by using acetone as a solvent to have a phosphoric acid at a concentration of 1% by weight and treated with a fluidized bed coating method (MP-01, POWREX) for 30 minutes to form the first layer.

For the second coating solution, a complex solution was prepared in which sodium silicate, mica fine particle, and bismuth (III) oxide fine particle were added at a concentration of 6% by weight, respectively, using water as a solvent. The solution was treated with a fluidized bed coating method for 30 minutes to form the second layer on the iron-based core powder on which the first layer was formed. In this case, the particle sizes of the mica fine particle and the bismuth (III) oxide fine particle and the crystal structure of the bismuth (III) oxide fine particle were changed as shown in Table 1.

The third coating solution was prepared by using water as a solvent and by adding polyacrylate polymer as a dispersant at a concentration of 0.7% by weight, ethylene bis stearamide (EBS) as an organic lubricant at a concentration of 4% by weight, and $MoS_2$ fine particle as an inorganic lubricant at a concentration of 0.7% by weight. Then, as shown in Table 1, the third layer was formed by changing the size of $MoS_2$ fine particle, the coating method, and the coating time.

TABLE 1

| sample | particle size of iron-based core powder (μm) | particle size of mica fine particle (μm) | crystal structure of bismuth (III) oxide fine particle | particle size of bismuth (III) oxide fine particle (μm) | particle size of ethylene bis stearamide (μm) | particle size of MoS2 fine particle (μm) | coating method | total coating time (min) | Increased amount of main elements after coating (wt %) Bi | P | Si |
|---|---|---|---|---|---|---|---|---|---|---|---|
| A | 220 | 2.4 | alpha | 1.3 | 22.5 | 8.7 | fluidized bed coating method | 90 | 0.41 | 0.08 | 0.22 |
| B | 35 | 2.4 | alpha | 1.3 | 22.5 | 8.7 | fluidized bed coating method | 90 | 0.26 | 0.12 | 0.29 |
| C | 220 | 43.2 | alpha | 38.3 | 4.4 | 0.5 | fluidized bed coating method | 90 | 0.08 | 0.08 | 0.06 |
| D | 220 | 2.4 | beta | 3.4 | 22.5 | 8.7 | fluidized bed coating method | 90 | 0.37 | 0.08 | 0.21 |
| E | 220 | 2.4 | alpha | 1.3 | 22.5 | 8.7 | high-speed rotating mixer | 135 | 0.45 | 0.10 | 0.23 |
| F | 220 | 2.4 | alpha | 1.3 | 22.5 | 8.7 | fluidized bed coating method | 15 | 0.16 | 0.06 | 0.09 |
| G | 220 | 2.4 | alpha | 1.3 | 22.5 | 8.7 | fluidized bed coating method | 300 | 0.83 | 0.16 | 0.48 |

In this case, Sample A is an example according to the present disclosure.

Then, Comparative Sample B was prepared to show the effect of the particle size of the iron-based core powder, and Sample C was compared to show the effect of the particle size of the fine particles.

In addition, Sample D was compared to show the effect of bismuth (III) oxide fine particle in a beta phase, and Comparative Samples E to G were compared to show the effect of the fluidized bed coating method and coating time. When the dispersion and adhesion of the coating solution was induced by using a high-speed rotating mixer, it was dried at 200° C. for minutes after mixing.

The soft magnetic iron-based powder thus prepared was compression molded at 50° C. and 800 MPa in a ring-shaped mold having an inner diameter of 45 mm, an outer diameter of 55 mm, and a height of 5 mm. Then, the molded core was heat-treated at 650° C. for 30 minutes in a nitrogen atmosphere.

The resistance of the core manufactured by the above method was measured with a 4-contact resistivity meter (RM3545, HIOKI), the magnetic properties were evaluated by a B-H meter (MPG200D, BROCKHAUS), and the results were shown in Table 2 below. In this case, the core was wound 40 times each in a primary circuit and a secondary circuit.

TABLE 2

| Sample | Core Density ($g/cm^2$) | Resistivity ($\mu\Omega \cdot m$) | Magnetic flux density (T@10 kA/m) | Maximum magnetic permeability | Coercive force (A/m) | Core loss (W/kg@1 T) @1 kHz |
|---|---|---|---|---|---|---|
| A | 7.48 | 738 | 1.51 | 413 | 104 | 101 |
| B | 7.26 | 2,274 | 1.34 | 245 | 133 | 98 |
| C | 7.47 | 54 | 1.53 | 464 | 121 | 416 |
| D | 7.44 | 188 | 1.50 | 428 | 119 | 216 |
| E | 7.38 | 103 | 1.46 | 376 | 133 | 268 |
| F | 7.52 | 137 | 1.54 | 487 | 101 | 353 |
| G | 7.38 | 477 | 1.37 | 257 | 142 | 190 |

As can be seen from Table 2, Sample A is an example that satisfies the conditions presented in the present disclosure. It was confirmed that Sample A had the resistivity of more than 200 $\mu\Omega \cdot m$, the saturation magnetic flux density of more than 1.4 T, the core loss of 200 W/kg at the induction of 1 T and at the frequency of 1 kHz, and the coercive force of less than 200 A/m.

However, Sample B was a comparative example in which the particle size of the iron-based core powder was smaller than the suggested particle size. The magnetic flux density and maximum magnetic permeability of Sample B did not satisfy the physical properties required by the present disclosure.

In addition, Sample C was a comparative example in which the particle size of the fine particles dispersed in the second coating solution, or the third coating solution did not satisfy the suggested particle size. The resistivity and core loss of Sample C did not satisfy the physical properties required by the present disclosure.

In addition, Sample D was a comparative example to show the effect of bismuth (III) oxide fine particle in a beta phase. The resistivity and core loss of Sample D did not satisfy the physical properties required by the present disclosure.

In addition, Samples E-G were comparative examples to show the effect of the fluidized bed coating method and coating time. The resistivity and core loss of Samples E and F did not satisfy the physical properties required in the present disclosure. The magnetic flux density and maximum magnetic permeability of Sample G did not satisfy the physical properties required in the present disclosure.

Although the present disclosure has been described with reference to the accompanying drawings and the above-described embodiments, the present disclosure is not limited thereto but is defined by the following claims. Accordingly, those of ordinary skill in the art can variously change and modify the present disclosure within the scope without departing from the spirit of the claims to be described later.

What is claimed is:

1. A soft magnetic iron-based powder comprising:
- an iron-based core powder formed in a powder form;
- a first layer formed on a surface of the iron-based core powder and coated with an inorganic material containing a phosphate;
- a second layer formed on a surface of the first layer, in which sodium silicate, mica fine particle, and bismuth (III) oxide fine particle are distributed; and
- a third layer formed on the surface of the first layer or the second layer whose surface is exposed, in which an organic lubricant and an inorganic lubricant are distributed.

2. The soft magnetic iron-based powder according to claim 1, wherein a particle size of the iron-based core powder is in a range of 45 to 500 μm.

3. The soft magnetic iron-based powder according to claim 1, wherein the first layer is iron phosphate formed by an oxidation reaction of the phosphate and the iron-based core powder.

4. The soft magnetic iron-based powder according to claim 1, wherein the sodium silicate, the mica fine particle, and the bismuth (III) oxide fine particle in the second layer are physically attached to the surface of the first layer.

5. The soft magnetic iron-based powder according to claim 1, wherein particle sizes of the mica fine particle and the bismuth (III) oxide fine particle of the second layer are 1/10 or less of a particle size of the iron-based core powder.

6. The soft magnetic iron-based powder according to claim 5, wherein the particle sizes of the mica fine particle and the bismuth (III) oxide fine particle of the second layer are 4.5 μm or less.

7. The soft magnetic iron-based powder according to claim 1, wherein a crystal structure of the bismuth (III) oxide fine particle of the second layer is an alpha phase.

8. The soft magnetic iron-based powder according to claim 1, wherein the organic lubricant and the inorganic lubricant of the third layer are solid lubricants, and
- wherein particle sizes of the organic lubricant and the inorganic lubricant of the third layer are larger than a surface roughness of the iron-based core powder.

9. The soft magnetic iron-based powder according to claim 8, wherein the particle sizes of the organic lubricant and the inorganic lubricant of the third layer are in a range of 5 to 45 μm.

10. The soft magnetic iron-based powder according to claim 1, wherein the inorganic lubricant comprises molybdenum disulfide ($MoS_2$) or boron nitride (BN).

11. A method for manufacturing a soft magnetic iron-based powder, the method comprising:
- preparing an iron-based core powder;
- preparing a first coating solution containing phosphoric acid;
- forming a first layer coated with an inorganic material containing phosphate on a surface of the iron-based core powder by spraying the first coating solution on the surface of the iron-based core powder;
- preparing a second coating solution in which sodium silicate, mica fine particle, and bismuth (III) oxide fine particle are dispersed;

forming a second layer in which the sodium silicate, the mica fine particle, and the bismuth (III) oxide fine particle are distributed on the surface of the first layer by spraying the second coating solution on the iron-based core powder on which the first layer is formed;

preparing a third coating solution in which an organic lubricant and an inorganic lubricant are dispersed; and forming a third layer in which the organic lubricant and the inorganic lubricant are distributed on the surface of the first layer or the second layer whose surface is exposed by spraying the third coating solution on the iron-based core powder on which the second layer is formed.

12. The method according to claim 11, wherein, in the step of preparing the core powder, a particle size of the iron-based core powder is in a range of 45 to 500 μm.

13. The method according to claim 11, wherein, in the step of preparing the first coating solution, the first coating solution is prepared by dissolving 0.1 to 5% by weight of phosphoric acid with respect to 100% by weight of acetone.

14. The method according to claim 11, wherein, in the step of forming the first layer, the first layer is formed on the surface of the iron-based core powder by spraying the first coating solution in a state in which the iron-based core powder is suspended.

15. The method according to claim 14, wherein, in the step of forming the first layer, the first layer is formed by an oxidation reaction of the first coating solution and the iron-based core powder.

16. The method according to claim 11, wherein, in the step of preparing the second coating solution, the second coating solution is prepared by dispersing 2 to 10% by weight of the sodium silicate, 2 to 10% by weight of the mica fine particle, and 2 to 10% by weight of the bismuth (III) oxide fine particle with respect to 100% by weight of water, and Wherein, in the step of preparing the third coating solution, the third coating solution is prepared by dispersing 1 to 8% by weight of the organic lubricant and 0.1 to 2% by weight of the inorganic lubricant with respect to 100% by weight of the water.

17. The method according to claim 11, wherein, in the step of forming the second layer, the sodium silicate, the mica fine particle, and the bismuth (III) oxide fine particle are physically attached to the surface of the first layer, and wherein, in the step of forming the third layer, the organic lubricant and the inorganic lubricant are physically attached to the surface of the first layer or the second layer whose surface is exposed.

18. A method for manufacturing a soft magnetic composite, the method comprising:

preparing an iron-based core powder, the iron-based core powder including a first layer coated with an inorganic material containing phosphate formed on a surface of the iron-based core powder, a second layer in which sodium silicate, mica fine particle, and bismuth (III) oxide fine particle are distributed on a surface of the first layer, and a third layer formed on the surface of the first layer or a surface of the second layer whose surface is exposed, in which an organic lubricant and an inorganic lubricant are distributed;

compression molding the iron-based core powder into a molded article having a predetermined shape using a mold heated to room temperature or 80° C. or less; and heat-treating the molded article at a temperature in a range of 600 to 700° C.

19. The method according to claim 18, wherein the step of preparing of the iron-based core powder comprises:

preparing the iron-based core powder;

preparing a first coating solution containing phosphoric acid;

forming the first layer coated with the inorganic material containing the phosphate on the surface of the iron-based core powder by spraying the first coating solution on the surface of the iron-based core powder;

preparing a second coating solution in which the sodium silicate, the mica fine particle, and the bismuth (III) oxide fine particle are dispersed;

forming the second layer in which the sodium silicate, the mica fine particle, and the bismuth (III) oxide fine particle are distributed on the surface of the first layer by spraying the second coating solution on the iron-based core powder on which the first layer is formed;

preparing a third coating solution in which the organic lubricant and the inorganic lubricant are dispersed; and forming the third layer in which the organic lubricant and the inorganic lubricant are distributed on the surface of the first or second layer whose surface is exposed by spraying the third coating solution on the iron-based core powder on which the second layer is formed.

20. The method according to claim 18, wherein the molded article that has undergone the heat-treating has a resistivity of more than 200 μΩ·m, a saturation magnetic flux density of more than 1.4 T, a core loss of less than 200 W/kg at 1 T induction and 1 kHz frequency, and a coercive force of 200 A/m.

* * * * *